(12) United States Patent
Walker et al.

(10) Patent No.: US 9,675,006 B2
(45) Date of Patent: Jun. 13, 2017

(54) ROW DIVIDER FOR A CORN HEAD ASSEMBLY HAVING A HOOD WITH A STRUCTURED SURFACE

(71) Applicant: CNH America LLC, New Holland, PA (US)

(72) Inventors: Eric L. Walker, Leola, PA (US); Brian Patrick Crow, Rock Island, IL (US); James Michael Gessel, Geneseo, IL (US); Frederick Robert Hubach, Stevens, PA (US)

(73) Assignee: CNH Industrial America LLC, New Holland, PA (US)

( * ) Notice: Subject to any disclaimer, the term of this patent is extended or adjusted under 35 U.S.C. 154(b) by 436 days.

(21) Appl. No.: 13/859,081

(22) Filed: Apr. 9, 2013

(65) Prior Publication Data
US 2014/0298769 A1    Oct. 9, 2014

(51) Int. Cl.
*A01D 45/02*    (2006.01)

(52) U.S. Cl.
CPC .................................. *A01D 45/021* (2013.01)

(58) Field of Classification Search
CPC .... A01D 45/021; A01D 43/082; A01D 65/00; A01D 45/02; A01D 45/028; A01D 45/24; A01D 45/22; A01D 45/30; A01D 45/00
USPC .......................................... 56/119, 113, 312
See application file for complete search history.

(56) References Cited

U.S. PATENT DOCUMENTS

| 762,795 | A | | 6/1904 | Ackerman | |
|---|---|---|---|---|---|
| 1,800,058 | A | | 4/1931 | Dugger | |
| 1,978,968 | A | * | 10/1934 | Steel | 56/104 |
| 2,751,744 | A | | 6/1956 | Reade et al. | |
| 2,811,005 | A | | 10/1957 | Porath | |
| 2,867,961 | A | * | 1/1959 | Heilbrun | 56/119 |
| 2,981,045 | A | | 4/1961 | Blanshine et al. | |
| 3,209,526 | A | | 10/1965 | Morrow et al. | |
| 3,271,940 | A | * | 9/1966 | Ashton et al. | 56/105 |
| 3,331,196 | A | * | 7/1967 | Grant | 56/106 |
| 3,433,004 | A | | 3/1969 | Blunk et al. | |

(Continued)

FOREIGN PATENT DOCUMENTS

EP          2415342 A1     2/2012
WO    WO 2014168706 A1 *  10/2014

OTHER PUBLICATIONS

PCT/US2014/023446, International Search Report, mailed Jun. 5, 2014, 4 pages.

(Continued)

*Primary Examiner* — Thomas B Will
*Assistant Examiner* — Joan D Misa
(74) *Attorney, Agent, or Firm* — Peter K. Zacharias; Patrick M. Sheldrake

(57) ABSTRACT

A corn head assembly for a combine harvester capable of reducing grain loss. The corn head assembly includes a frame, a plurality of row units and a hood. The frame is mounted to a forward end of the combine harvester. The plurality of row units extends forward from the frame. The hood extends between an adjacent pair of row units. The hood includes a first end proximal to the frame, a second end distal to the frame and opposite the first end, and an outer surface extending between the first and second ends. The outer surface has a plurality of structures configured to inhibit a flow of grain in a forward direction along the outer surface.

20 Claims, 11 Drawing Sheets

(56) References Cited

U.S. PATENT DOCUMENTS

| | | | |
|---|---|---|---|
| 3,462,922 A | | 8/1969 | Phillips et al. |
| 3,584,444 A | * | 6/1971 | Sammann et al. ............... 56/119 |
| 3,646,737 A | * | 3/1972 | Grant ............................. 56/106 |
| RE27,554 E | * | 1/1973 | Ashton et al. ....... A01D 45/021 56/105 |
| 3,719,034 A | * | 3/1973 | Lange ............................. 56/119 |
| 3,759,021 A | | 9/1973 | Schreiner et al. |
| 3,808,783 A | | 5/1974 | Sutherland et al. |
| 3,911,651 A | | 10/1975 | Schreiber |
| 4,037,393 A | * | 7/1977 | Anderson ........................ 56/119 |
| 4,084,396 A | * | 4/1978 | Fritz et al. ........................ 56/98 |
| 4,156,338 A | | 5/1979 | Hengen |
| 4,300,335 A | | 11/1981 | Anderson |
| 4,524,571 A | * | 6/1985 | Mak et al. ........................ 56/98 |
| 4,538,404 A | * | 9/1985 | Heimark et al. ................ 56/314 |
| 4,584,825 A | * | 4/1986 | Atkinson ........................ 56/119 |
| 5,195,309 A | | 3/1993 | Mossman |
| 6,032,445 A | * | 3/2000 | Heintzman ..................... 56/119 |
| 6,625,969 B2 | | 9/2003 | Glazik |
| 6,901,730 B1 | | 6/2005 | Buresch et al. |
| 7,073,316 B2 | | 7/2006 | Resing et al. |
| 7,240,471 B2 | | 7/2007 | Mossman |
| 7,373,767 B2 | | 5/2008 | Calmer |
| 7,814,737 B2 | | 10/2010 | Pierson |
| 7,874,134 B1 | | 1/2011 | Hoffman |
| 7,913,480 B2 | | 3/2011 | Christensen et al. |
| 8,196,381 B2 | * | 6/2012 | Herman ................. A01D 45/22 56/207 |
| D697,944 S | * | 1/2014 | Walker et al. ................. D15/28 |
| 9,179,601 B2 | * | 11/2015 | Walker ................. A01D 45/021 |

OTHER PUBLICATIONS

PCT/US2014/023446, Written Opinion, mailed Jun. 5, 2014, 6 pages.

* cited by examiner

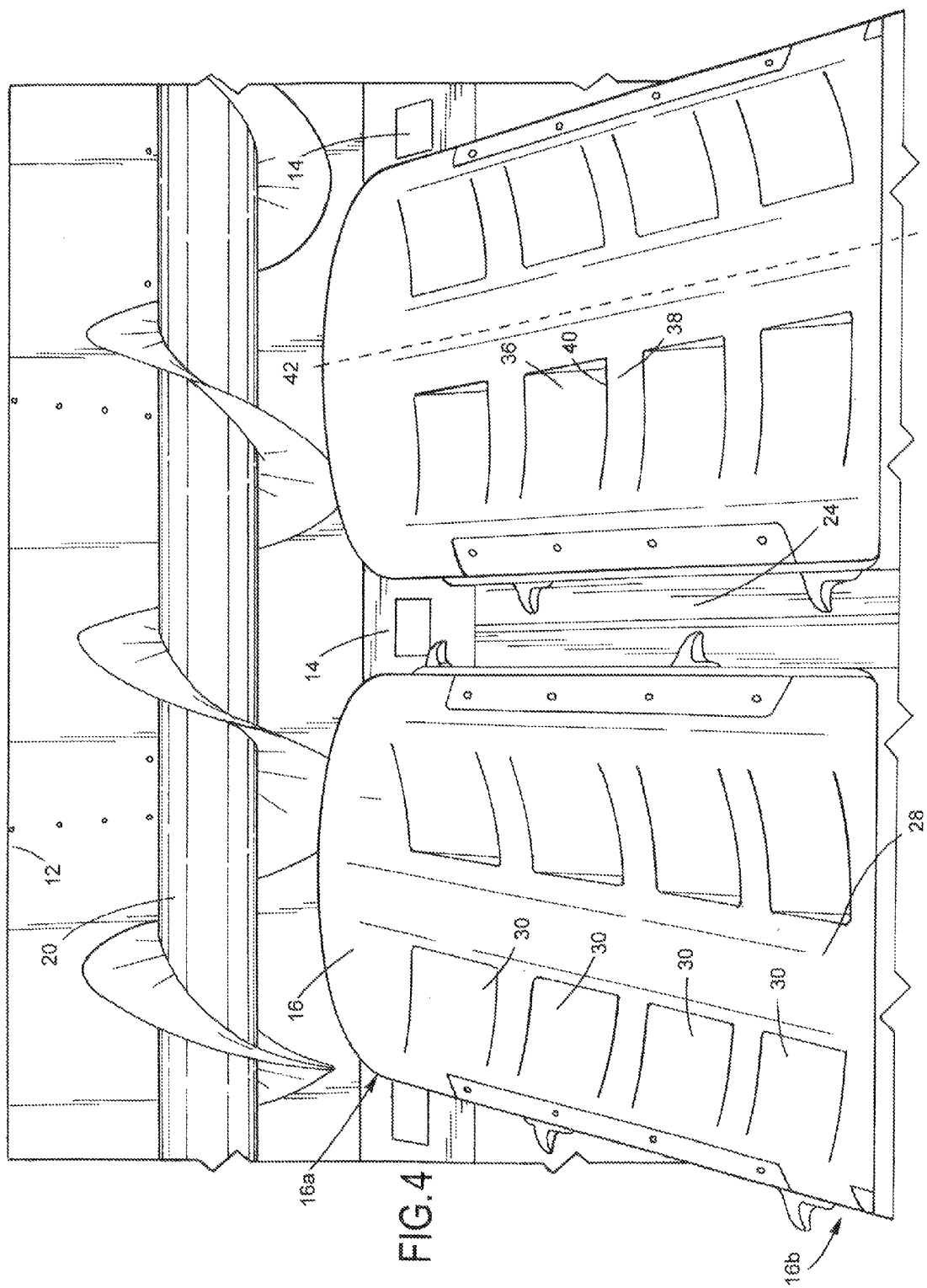

ROW DIVIDER FOR A CORN HEAD ASSEMBLY HAVING A HOOD WITH A STRUCTURED SURFACE

BACKGROUND OF THE INVENTION

The present invention relates generally to corn head assemblies for use with combine harvesters. In particular, the present invention relates to an improved corn head assembly having a row divider with a hood that includes a structured surface to inhibit the loss of grain during harvesting operations.

An agricultural combine is a machine used to harvest a variety of crops from a field. During a harvesting operation, a corn head assembly at the front of the combine cuts ripened crop from the field. A feederhouse supporting the corn head assembly transfers the crop material into the combine. Threshing and separating assemblies within the combine remove grain from the crop material and transfer the clean grain to a grain tank for temporary holding. Crop material other than grain (MOG) exits from the rear of the combine. An unloading auger transfers the clean grain from the grain tank to a truck or grain cart for transport, or to another receiving bin on or off machine for holding.

Combines that harvest corn are provided with row dividers for directing rows of corn stalks to ear separation chambers or stripping plates and then to an auger for conveying the corn to a feederhouse of the combine. Conventional corn head assemblies have smooth areas behind the row dividers, which allow harvested corn to slide rearward to the corn head assembly's auger. These smooth areas, however, also allow for harvested corn to slide away from the auger when insufficient crop material is processed through the corn head assembly, such as when the combine passes through an area of poor crop density or an end of a harvesting row. As such, this leads to a loss of harvested crop material and ultimately an economic loss.

Thus, there is still a need for a combine harvester that is capable of preventing crop loss at the corn head assembly location and which addresses the aforementioned drawbacks of conventional corn head assemblies. Such a need is satisfied by the row divider of a corn head assembly for a combine harvester of the present invention.

BRIEF SUMMARY OF THE INVENTION

In accordance with a preferred embodiment, the present invention provides a corn head assembly for a combine harvester that includes a frame, a plurality of row units and a hood. The frame mounts to a forward end of the combine harvester. The plurality of row units extends forward from the frame. The hood extends between an adjacent pair of row units. The hood includes a first end proximal to the frame, a second end distal to the frame and opposite the first end, and an outer surface extending between the first and second ends. The outer surface also includes a plurality of structures configured to inhibit a flow of grain in a forward direction along the outer surface.

In a second aspect, the present invention provides a corn head assembly for a combine harvester that includes a frame, a plurality of row units and a hood. The frame mounts to a forward end of the combine harvester. The plurality of row units extends forward from the frame. The hood extends between an adjacent pair of row units and includes a means for inhibiting a flow of grain in a forward direction along an outer surface of the hood.

In a third aspect, the present invention provides a row divider for an agricultural combine header that includes a front portion and a rear portion. The front portion is for guiding crop material into the header. The rear portion is for covering a part of the header. The rear portion includes an outer surface having a plurality of structures sweeping rearward to inhibit a flow of grain in a forward direction along the outer surface.

BRIEF DESCRIPTION OF THE SEVERAL VIEWS OF THE DRAWINGS

The foregoing summary, as well as the following detailed description of the preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings:

FIG. 4 is an enlarged partial perspective view of the corn head assembly of FIG. 1;

DETAILED DESCRIPTION OF THE INVENTION

Reference will now be made in detail to the preferred embodiments of the invention illustrated in the accompanying drawings. Wherever possible, the same or like reference numbers will be used throughout the drawings to refer to the same or like features. It should be noted that the drawings are in simplified form and are not drawn to precise scale. In reference to the disclosure herein, for purposes of convenience and clarity only, directional terms such as top, bottom, above, below and diagonal, are used with respect to the accompanying drawings. Such directional terms used in conjunction with the following description of the drawings should not be construed to limit the scope of the invention in any manner not explicitly set forth. Additionally, the term "a," as used in the specification, means "at least one." The terminology includes the words above specifically mentioned, derivatives thereof, and words of similar import.

The terms "grain," "tailing," and "crop material" are used throughout the specification for convenience and it should be understood that these terms are not intended to be limiting. Thus, "grain" refers to that part of a crop which is harvested and separated from discardable portions of the crop material.

Figure 1:
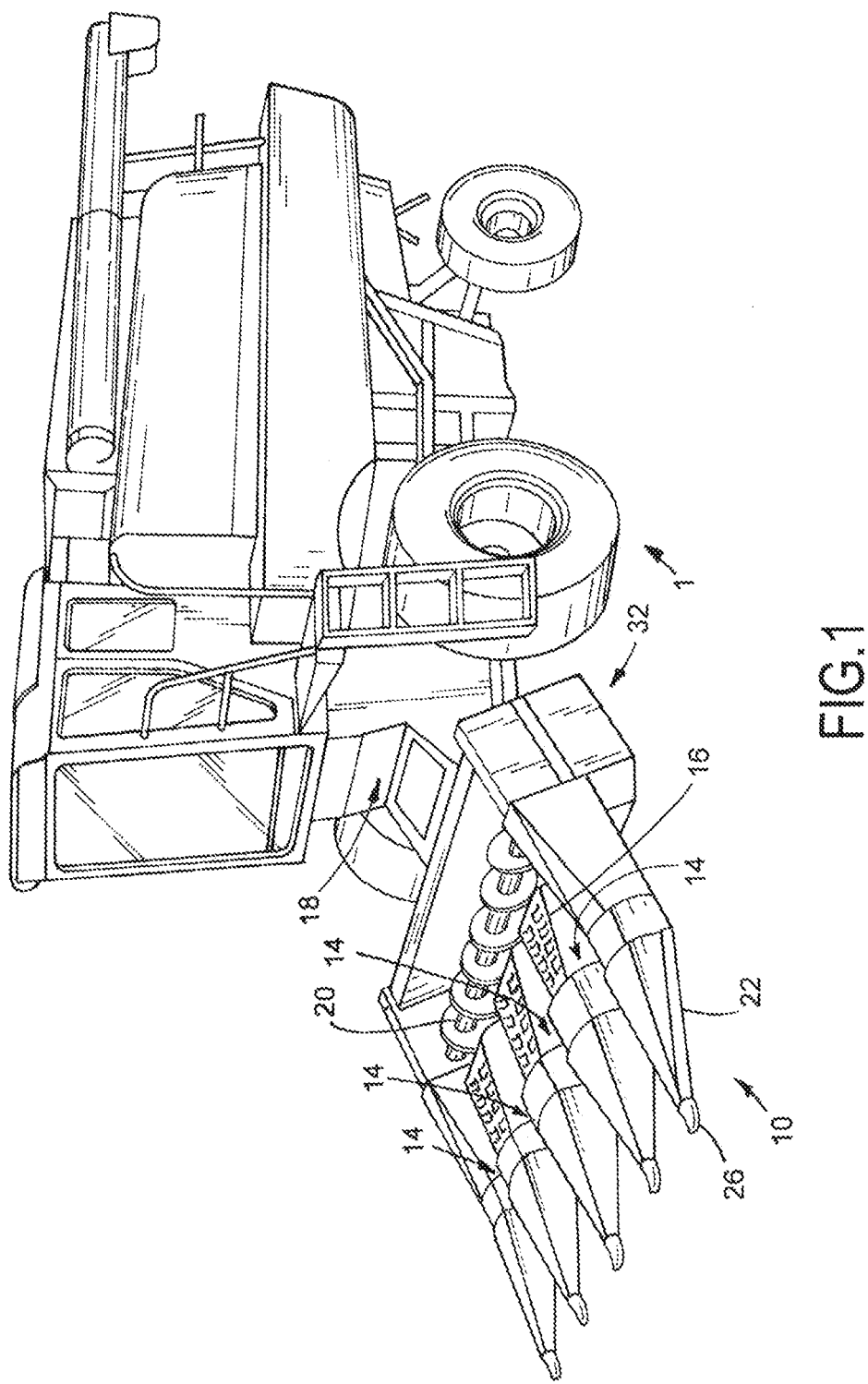
FIG. 1 is a perspective view of an agricultural combine having a corn head assembly according to a preferred embodiment of the present invention.

Referring now to the drawings, wherein preferred embodiments of the present invention are shown, FIG. 1 illustrates a corn head assembly 10 of the present invention as applied to an agricultural combine or combine harvester 1. The corn head assembly 10 is shown to be operatively connected to the combine harvester 1 for harvesting corn and feeding the corn to a feederhouse 18. Such feederhouses and harvesting operations of the combine harvester are known in the art and a further detailed description of their structure, function and operation is not necessary for a complete understanding of the present invention. However, typical corn head assemblies applicable to the present invention are disclosed in U.S. Pat. Nos. 3,808,783 and 3,759,021, the entire disclosures of which are incorporated by reference herein. A variety of row dividers also applicable to the present invention are disclosed in U.S. Pat. No. 5,195,309, the entire disclosure of which is incorporated by reference herein.

Figure 2:
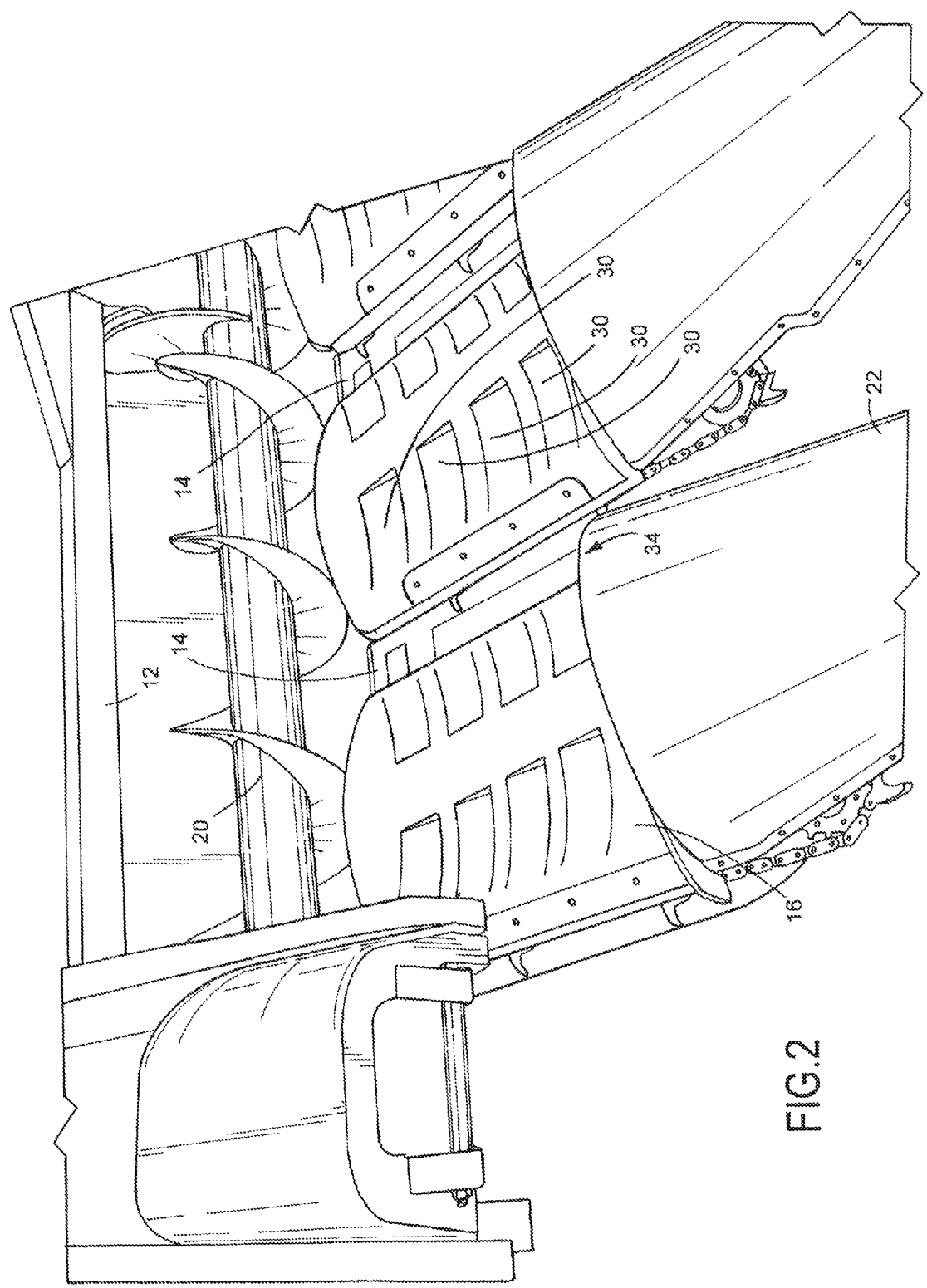
FIG. 2 is an enlarged partial perspective view of the corn head assembly of FIG. 1.

Referring to FIGS. 2 and 4, in a first preferred embodiment, the corn head assembly 10 includes a frame 12 for mounting to a forward end of the combine harvester 1, a plurality of row units 14 extending forward from the frame 12 and a hood 16 extending between an adjacent pair of row units 14. The hood 16 includes a first end 16a proximal to the frame 12, a second end 16b distal to the frame 12 and opposite the first end 16a, and an outer surface 28 extending between the first and second ends 16a, 16b. The outer surface 28 is configured to have a plurality of structures 30 for inhibiting a flow of grain in a forward direction along the outer surface 28. The hood 16 is generally configured as a convex shaped hood that extends between the adjacent pair of row units 14 to cover the space between said pair of row units 14 (FIGS. 3 and 4) so as to prevent the loss of grain from falling to the ground during harvesting operations.

Figure 3:
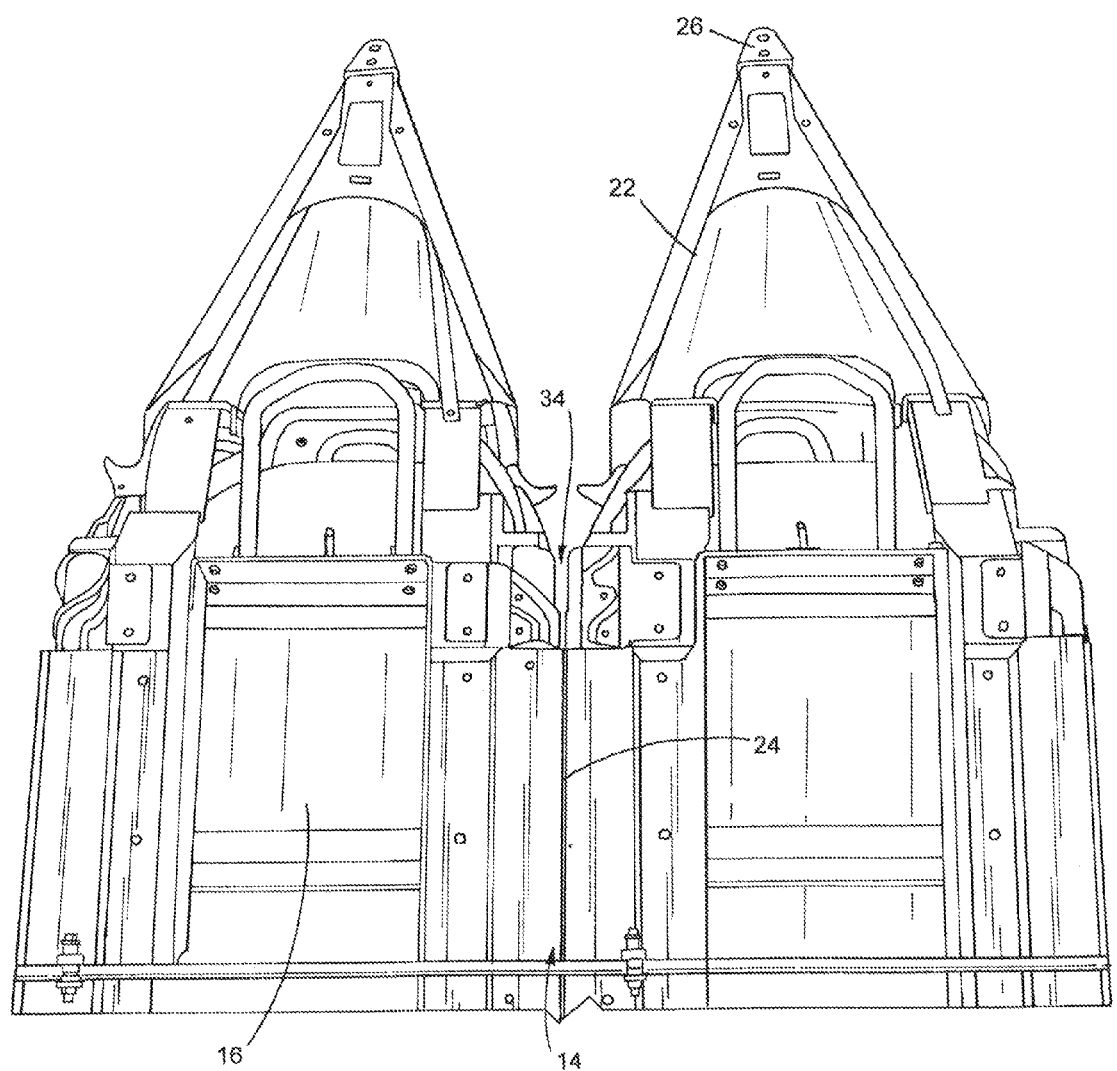
FIG. 3 is an enlarged partial bottom view of the corn head assembly of FIG. 1.

Referring to FIGS. 1-3, the combine harvester 1 includes a conveyor 20, as best shown in FIG. 2. The conveyor 20 conveys grain separated from the stalk by the row units 14 to the feederhouse 18 once the grain is received within a channel of the conveyor 20. The conveyor 20 is connected to the frame 12 about its side walls and is situated within the channel extending between the side walls of the frame 12. As such, grain received within the channel is conveyed towards the feederhouse 18 by the conveyor 20. The conveyor 20 is positioned in front or above a combine feeding location and rearward of the row dividers 22 and hood 16.

Referring to FIGS. 3 and 4, the plurality of row units 14 are each preferably configured as shown. Such row units 14 are known in the art and a further detailed description of their structure, function and operation is not necessary for a complete understanding of the present invention. However, typical row units applicable to the present invention are disclosed in U.S. Pat. Nos. 7,913,480, 7,874,134 and 7,373,767, the entire disclosures of which are incorporated by reference herein.

Each of the plurality of row units 14 is attached to the frame 12 and extends in a forward direction from the frame 12 and away from the combine harvester 1. Each row unit 14 includes a deck plate (also commonly known as a stripping plate) 24 mounted to a row unit frame. The stripping plate 24 has a length that extends forward from the frame 12 and extends a length substantially the same as a longitudinal length of the hood 16. In operation, crop material is stripped from the stalks as they are pulled within the row unit 14 and enter a gap 34 formed by the stripping plates 24. The stripped grain is then conveyed to the conveyor 20 owing to the flow of crop material in a rearward direction during harvesting operation. That is, the subsequent flow of crop material entering the row units 14 pushes/pulls the harvested crop material rearward towards the conveyor 20.

As best shown in FIGS. 1-3, the plurality of dividers 22 extends forward from the frame 12. Such row dividers 22 are known in the art and a further detailed description of their structure, function and operation is not necessary for a complete understanding of the present invention. However, typical row dividers applicable to the present invention are disclosed in U.S. Pat. Nos. 6,625,969 and 7,073,316, the entire disclosures of which are incorporated by reference herein. The row dividers 22 extend forwardly from the frame 12 and are connected to the plurality of row units 14, as shown in FIG. 3, for directing e.g., a row of corn stalks towards the stripping plate 24 of the row unit 14.

The row dividers 22 include a generally conical shaped nose 26 and the hood 16. Such noses 26 of the row dividers 22 are known in the art and a further detailed description of their structure, function and operation is not necessary for a complete understanding of the present invention. However, further descriptions of such noses applicable to the present invention are disclosed in U.S. Pat. Nos. 7,240,471 and 7,814,737, the entire disclosures of which are incorporated by reference herein.

The hood 16 is generally configured as a convex shaped hood having a rectangular plan view profile. As shown in FIG. 4, the first end 16a of the hood 16 is the end closest to the frame 12 and the second end 16b is opposite the first end 16a. The hood 16 includes an outer surface 28 extending between the first and second ends 16a, 16b. The outer surface 28 is configured with a plurality of structures 30 for inhibiting a flow of grain in a substantially forward direction along the outer surface 28. The hood 16 is mounted behind the nose 26 of the divider 22. As shown in FIG. 4, the hood 16 is positioned above the adjacent pair of row units 14 and the hood 16 is positioned in front of a conveyor 20 extending across the frame 12.

Figure 6A:
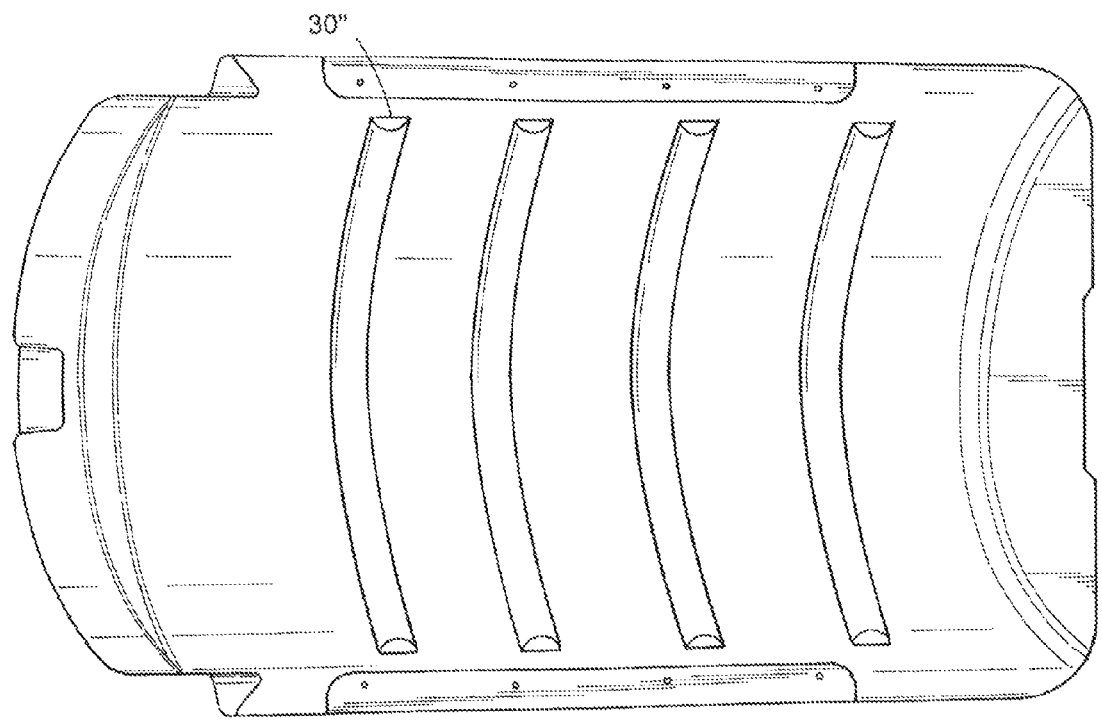
FIG. 6A is a top plan view of the hood of the corn head assembly of FIG. 1 having ribs.
Figure 6B:
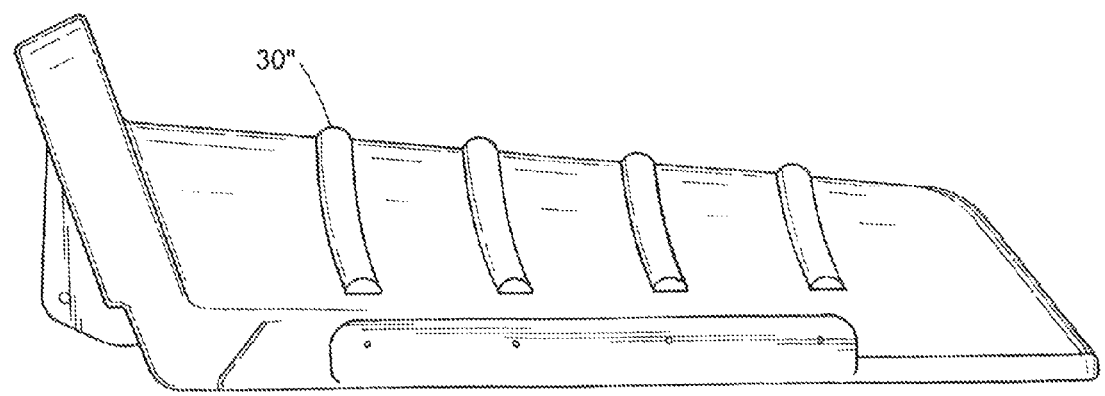
FIG. 6B is a side elevation view of the hood of FIG. 6A.
Figure 7A:
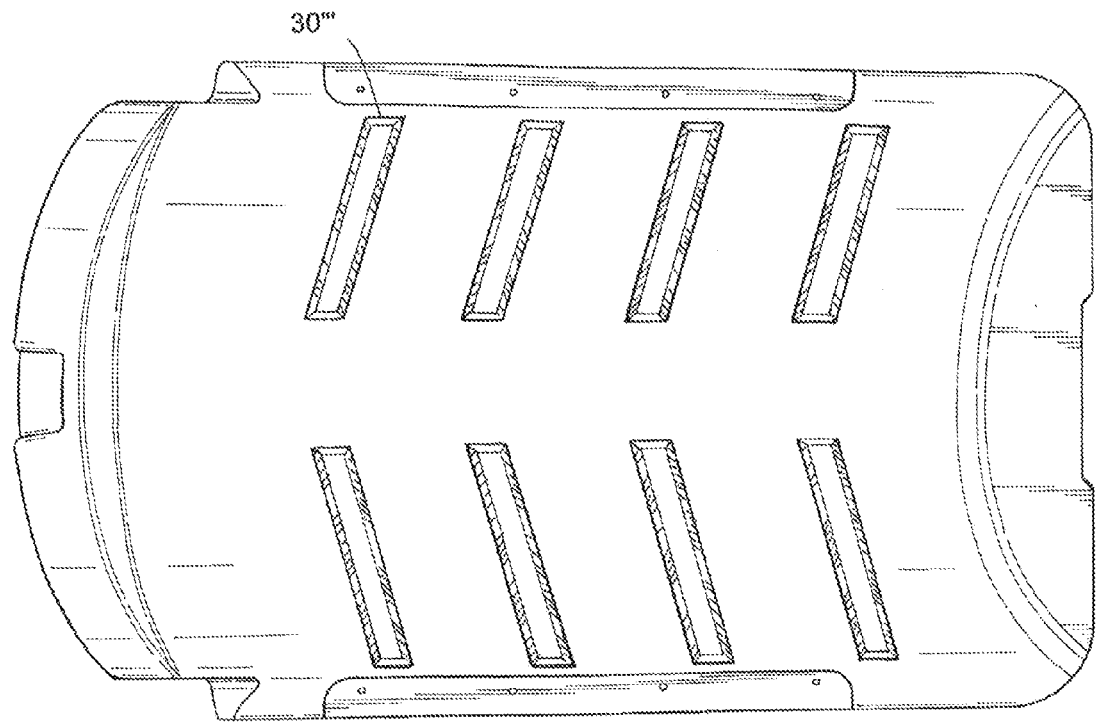
FIG. 7A is a top plan view of the hood of the corn head assembly of FIG. 1 having recesses.
Figure 7B:
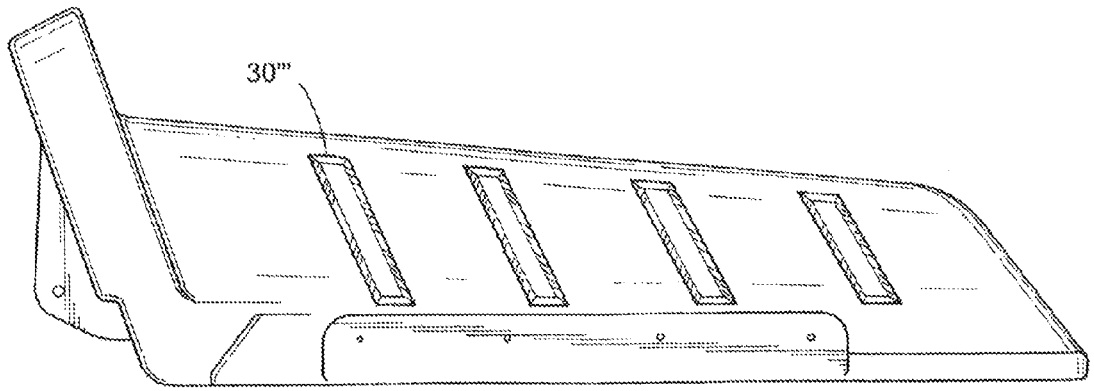
FIG. 7B is a side elevation view of the hood of FIG. 7A.
Figure 8A:
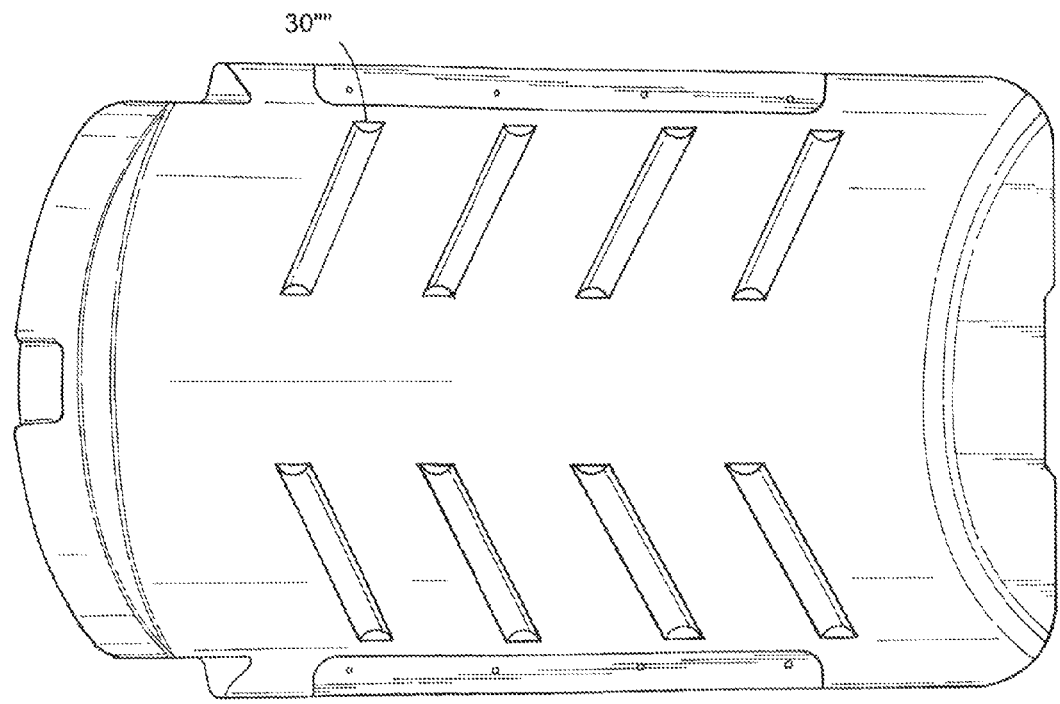
FIG. 8A is a top plan view of the hood of the corn head assembly of FIG. 1 having protrusions.
Figure 8B:
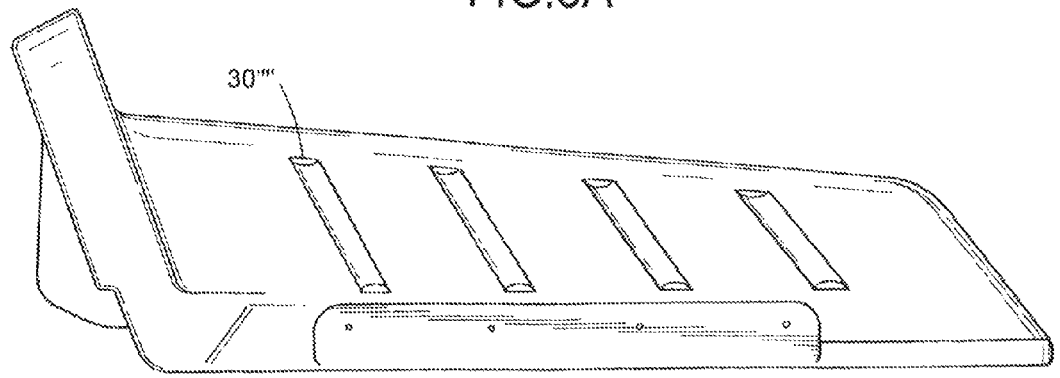
FIG. 8B is a side elevation view of the hood of FIG. 8A.

The plurality of structures 30 can be any structure formed about the outer surface 28 of the hood 16 capable of inhibiting the flow of grain in a substantially forward direction which gets deposited on the hood 16. Further, the structures 30 are preferably configured to redirect the flow of grain in a rearward direction so as to deposit the grain in a most proximal position as possible along the row unit 14 for conveyance towards the conveyor 20. For example, each structure 30 can be configured as a curved corrugation (FIGS. 5A and 5B), a straight corrugation 30' (FIGS. 5C and 5D), a rib 30" (FIGS. 6A and 6B), a recess 30'" (FIGS. 7A and 7B), a protrusion 30"" (FIGS. 8A and 8B), or combinations thereof, or any other structure capable of retaining or inhibiting grain from sliding forward along the outer surface 28 of the hood 16. The structure 30 can be integrally formed as part of the outer surface 28 or attachable to the outer surface 28 of the hood 16.

As shown in FIGS. 2, 4, 5A and 5B, the structures 30 on the outer surface 28 of the hood 16 are preferably configured as a curved corrugation. The structures 30 are aligned in a row extending from the first end 16a of the hood 16 to the second end 16b of the hood 16. The structures 30 are configured to extend from about a midline 42 of the hood 16, which extends from the first end 16a to the second end 16b, towards the lateral sides of the hood and towards the first end 16a of the hood 16. In other words, the structures 30 are configured to slope rearwards towards the frame 12.

The corrugations are preferably formed as indented corrugations extending into the hood 16 having a rearward facing surface 38 that slopes or curves towards the first end 16a. The structures 30 also include a sloping surface 36 that slopes in a downward and forward direction along the hood 16 for directing the flow of loose grain in a substantially forward direction along the hood 16. Each structure 30 is spaced from an adjacent structure 30. Preferably, each hood 16 is configured with eight structures, but can be configured with more or less than eight structures. Owing to the indented sloped configuration of the structures 30, each structure 30 forms a trough 40. In other words, the trough 40 is formed by the rearward facing surface 38 and the sloping surface 36. The trough 40 facilitates retention of loose grain flowing across the hood 16.

In other words, the present invention provides a row divider 22 for an agricultural combine header 32 that includes a front portion and a rear portion 16. The front portion guides crop material into the header 32. The rear portion 16 covers a part of the header 32 and includes an outer surface 28 having a plurality of structures 30 sweeping rearward to inhibit a flow of grain in a substantially forward direction along the outer surface 28. Each of the plurality of structures 30 is spaced apart and extends from a rearward end to a forward end of the rear portion. Additionally, each of the plurality of structures 30 is configured to sweep rearwards from about a midline of the rear portion 16. The rear portion 16 is positioned above an adjacent pair of row units 14 of the header 32. Further, the rear portion 16 is positioned in front of a conveyor 20 extending across the header 32.

In operation, during harvesting, rows of plants to be harvested are aligned and directed to the gap 34 formed by the stripping plates 24. As the combine harvester 1 moves across a row of crops, plants are guided towards the gap 34 by the dividers 22, and more specifically the noses 26 of the dividers 22, where ears of corn are then stripped from the stalks due to the stripping plates 24 and operation of stalk rollers (not shown) which pull the stalk material in a downwardly direction. The stalks remain on the ground and the ears of corn move rearward and into the frame 12. The conveyor 20 then moves the ears of corn to the center of the frame 12 so as to be fed into the feederhouse 18. The configuration and operation of the intake arrangements are typical of standard combine harvesters.

During the stripping process, kernels of corn can be stripped from the ears and fall onto the combine harvester's divider region and then towards the ground. However, the hood 16, being positioned to cover the divider region of the row unit 14, effectively prevents or inhibits the flow of grain falling on the divider region from being deposited on the ground. That is, loose grain which is distributed on the divider region will now be retained or inhibited from falling to the ground by the hood 16 and recoverable for transport to the conveyor 20 by the flow of subsequent crop material over the hood 16 and row unit 14 as a result of the hood 16 directing the flow of loose grain towards a proximal end of the row units 14.

Figure 5A:
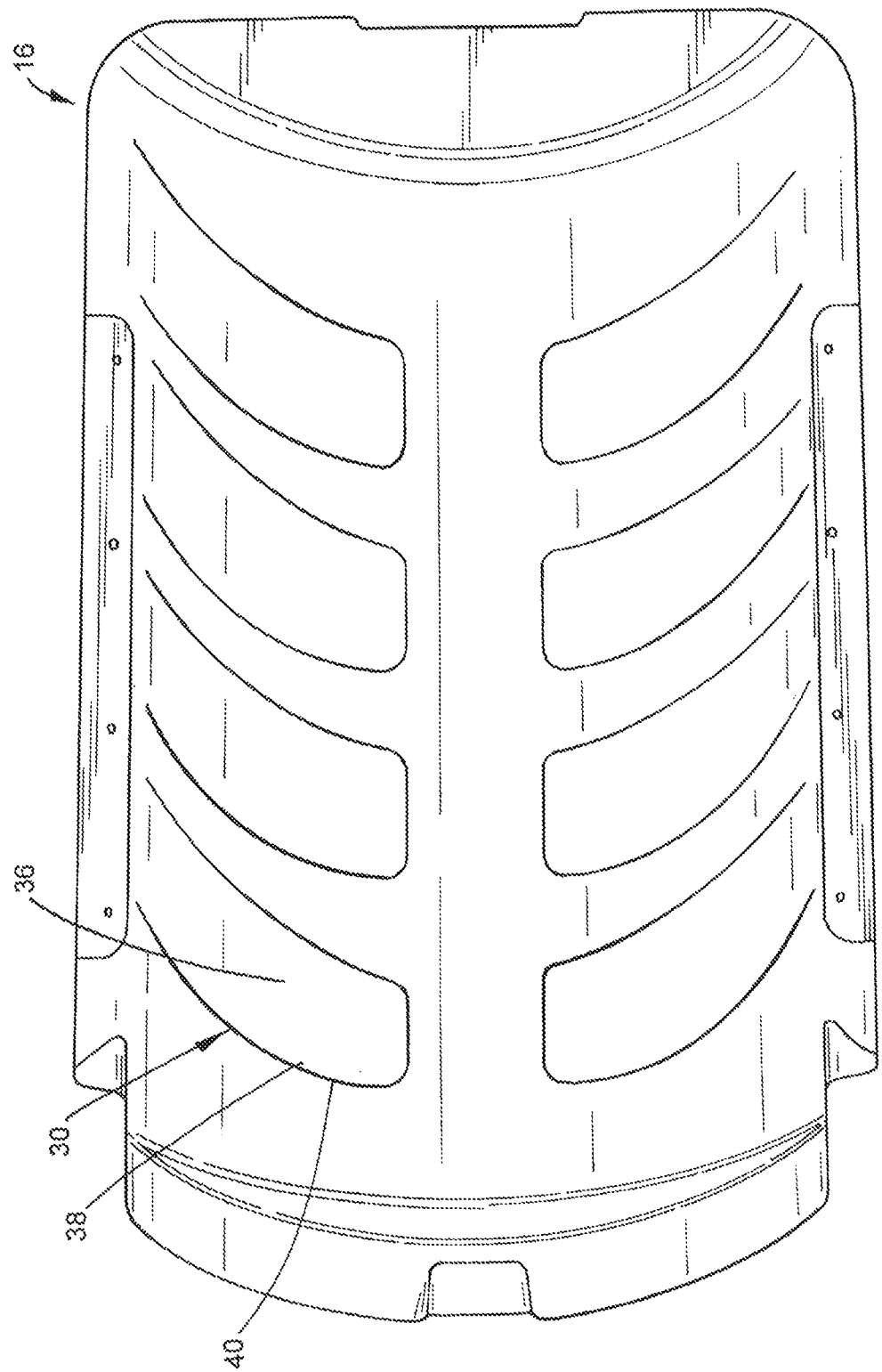
FIG. 5A is a top plan view of a hood of the corn head assembly of FIG. 1 having curved corrugations.
Figure 5B:
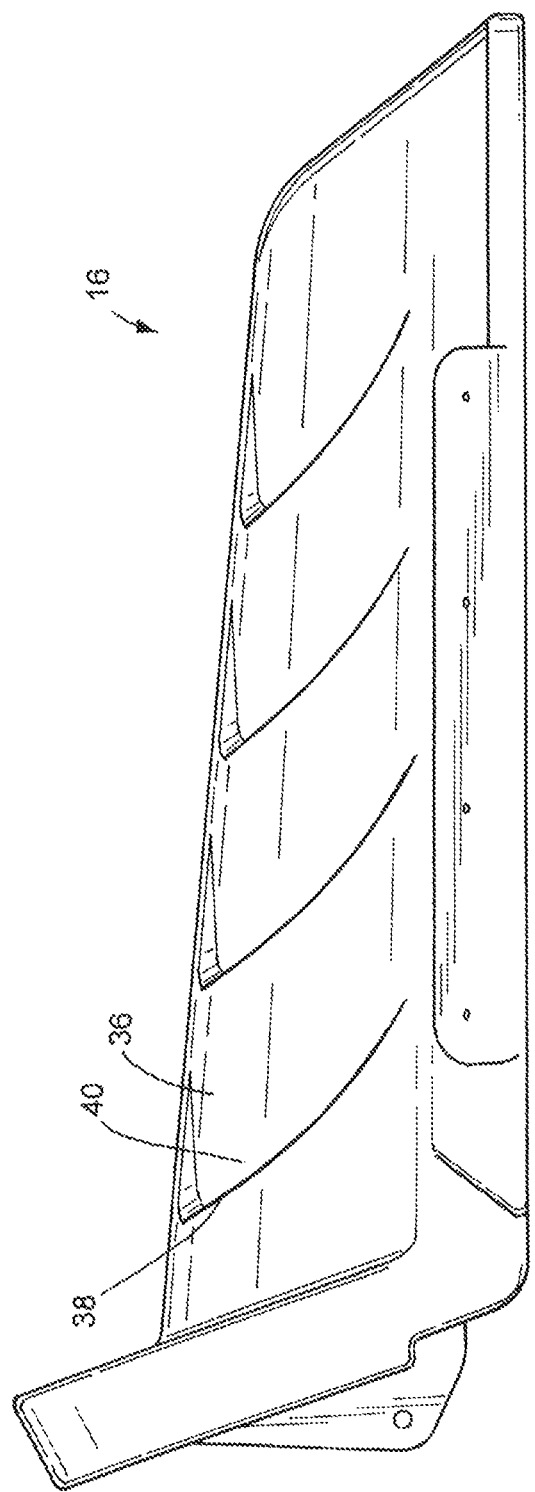
FIG. 5B is a side elevation view of the hood of FIG. 5A.
Figure 5C:
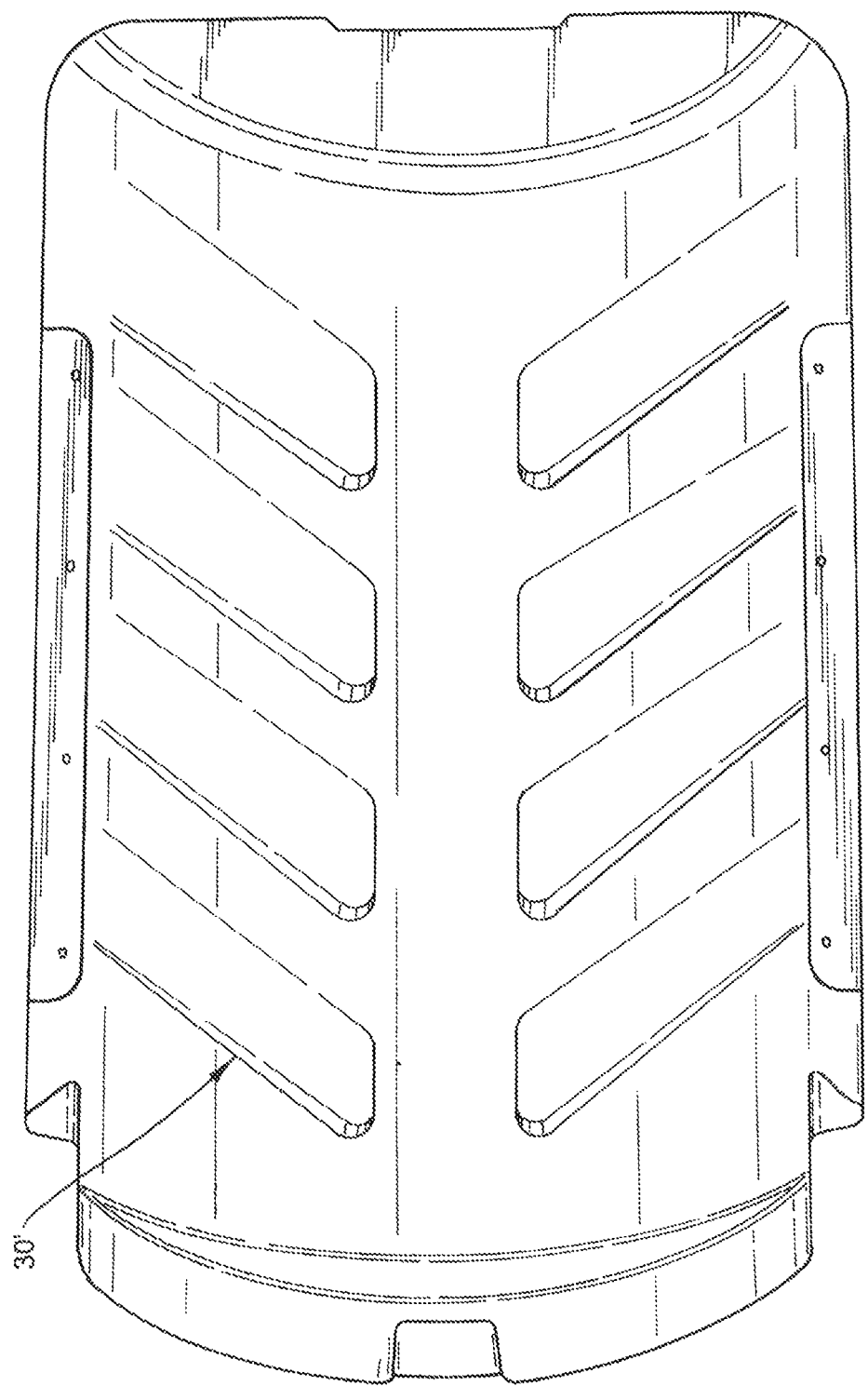
FIG. 5C is a top plan view of a hood of the corn head assembly of FIG. 1 having straight corrugations.
Figure 5D:
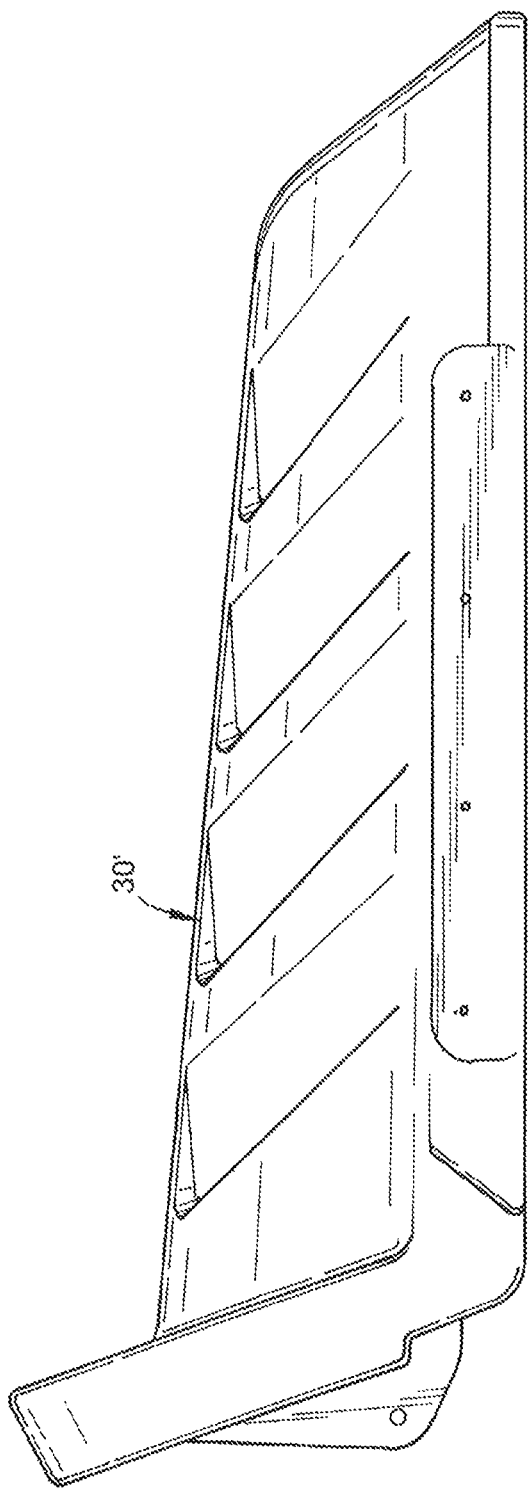
FIG. 5D is a side elevation view of the hood of FIG. 5C.

The hood 16 addresses the problems associated with loose grain falling on the divider region of each row unit 14. Specifically, the outer surface 28 inhibits or keeps grain from sliding forward and down towards the ground and redirects the grain to a more rearward position along the row unit 14. As shown in FIGS. 5A and 5B, grain that slides forward on the hood 16 surface will be stopped by the rearwardly facing surface 38 and settle in the trough 40. The kernels will remain in the trough 40 due to the height of the rearwardly facing surface 38 and slide downwards and rearward due to the rearward curved slope of the structure and overall convex shape of the hood 16. As a result, loose grain is deposited in a more proximal or rearward position along the row unit 14, thereby allowing such grain to be conveyed back to the conveyor 20 by the subsequent flow of crop material processed by the combine harvester 1.

It will be appreciated by those skilled in the art that changes could be made to the embodiments described above without departing from the broad inventive concept thereof. For example, alternative components and methods of cooperatively engaging the hood to the corn head assembly can be used. It is to be understood, therefore, that this invention is not limited to the particular embodiment disclosed, but it is intended to cover modifications within the spirit and scope of the present invention as defined by the appended claims.

We claim:

1. A corn head assembly for a combine harvester comprising:
   a frame for mounting to a forward end of the combine harvester;
   a plurality of row units extending forward from the frame;
   a hood extending between an adjacent pair of the plurality of row units, the hood comprising:
      a first end proximal to the frame,
      a second end distal to the frame and opposite the first end, and
      an outer surface extending between the first and second ends; and
   a plurality of elongated structures on the hood, each of the plurality of elongated structures comprising a surface facing the first end of the hood, the surface of each of the plurality of elongated structures extending laterally between a longitudinal midline of the hood and a lateral side of the hood and posteriorly between the second end and the first end of the hood.

2. The corn head assembly of claim 1, wherein the plurality of elongated structures are each configured as at least one of a corrugation, a rib, a recess, and a protrusion.

3. The corn head assembly of claim 1, wherein the plurality of elongated structures are aligned in a row extending from the first end to the second end.

4. The corn head assembly of claim 1, wherein each of the plurality of elongated structures are configured to slope towards the frame.

5. The corn head assembly of claim 1, wherein each of the plurality of elongated structures extends in a straight line such that the surface of each of the plurality of elongated structures extends in a straight line.

6. The corn head assembly of claim 1, wherein each of the plurality of elongated structures extends along a curved line such that the surface of each of the plurality of elongated structures extends along a curved line.

7. The corn head assembly of claim 1, wherein the hood is positioned in front of a conveyor extending across the frame.

8. The corn head assembly of claim 1, wherein each of the plurality of elongated structures is an elongated recess formed on the hood.

9. The corn head assembly of claim 1, wherein each of the plurality of elongated structures extends from the longitudinal midline laterally and posteriorly to the lateral side of the hood.

10. A corn head assembly for a combine harvester comprising:

a frame for mounting to a forward end of the combine harvester;

a plurality of row units extending forward from the frame;

a hood extending between an adjacent pair of the plurality of row units, the hood comprising a first end proximal to the frame and a second end distal to the frame and opposite the first end; and a plurality of elongated structures on the hood, each of the plurality of elongated structures comprising a surface facing the first end of the hood, the surface of each of the plurality of elongated structures extending laterally between a longitudinal midline of the hood and a lateral side of the hood and posteriorly between the second end and the first end of the hood.

11. The corn head assembly of claim 10, wherein each of the plurality of elongated structures extends in a straight line such that the surface of each of the plurality of elongated structures extends in a straight line.

12. The corn head assembly of claim 10, wherein each of the plurality of elongated structures extends along a curved line such that the surface of each of the plurality of elongated structures extends along a curved line.

13. The corn head assembly of claim 10, wherein each of the plurality of elongated structures is an elongated recess formed on the hood.

14. The corn head assembly of claim 10, wherein each of the plurality of elongated structures extends from the longitudinal midline laterally and posteriorly to the lateral side of the hood.

15. A row divider for an agricultural combine header comprising:

a front portion for guiding crop material into the header; and a rear portion for covering a part of the header, the rear portion includes an outer surface having a plurality of recessed elongated structures each tapering in depth from a longitudinal midline of the rear portion towards a lateral side of the rear portion to inhibit a flow of grain in a forward direction along the outer surface.

16. The row divider of claim 15, wherein the plurality of recessed elongated structures are each configured as a corrugation.

17. The row divider of claim 15, wherein each of the plurality of recessed elongated structures is spaced apart and extends from a forward end toward a rearward end of the rear portion.

18. The row divider of claim 15, wherein each of the plurality of recessed elongated structures sweeps rearwardly from about a longitudinal midline of the rear portion to about a lateral side of the rear portion.

19. The row divider of claim 15, wherein the rear portion is positioned above an adjacent pair of row units of the header.

20. The row divider of claim 15, wherein the rear portion is positioned in front of a conveyor extending across the header.

* * * * *